April 4, 1939. W. B. JONES 2,152,648
PLANT CONTAINER COVERING
Filed Feb. 13, 1936

Inventor
W. Bartlett Jones

Patented Apr. 4, 1939

2,152,648

UNITED STATES PATENT OFFICE 2,152,648

PLANT CONTAINER COVERING

W. Bartlett Jones, Chicago, Ill.

Application February 13, 1936, Serial No. 63,716

6 Claims. (Cl. 47—34)

The present invention relates to potted plants in clay or other kinds of pots which are porous to water. It has particular reference to a non-porous jacket or cover for the sides of the pot.

Clay pots are herein chosen as an example of plant containers which take water or moisture from the moist earth in the pot and expose it to evaporation. Such pots require very special care to insure the best results. This care is ordinarily not given in a home, largely through ignorance or lack of facilities.

A clay pot in a greenhouse or in a florist shop is usually placed on a moist bench of earth, sand or cinders. As the pot walls dry out by evaporation, the pot takes moisture from the moist bench. A pot on a dry bench must take all of its water from the moist earth in the pot. Therefore, a moist bench conserves moisture in the earth containing the plant roots.

There is great danger to the plant as soon as the pot walls become dry. This is subject to explanation. Clay pots, even on a moist bench, draw some moisture from the earth in the pot. This water moving from inside the pot to the pot walls carries soluble nutrients to the pot wall, and even into it. The white substance frequently seen on the outside walls of pots is one result of this action. Another result of this movement is the generation of roots next to the pot walls. Roots tend to grow where the nutrients are being concentrated. Hence in clay pots, a casing of roots is found which conforms to the shape of the pot, and which houses a core of earth. In non-porous pots the roots ramify through the earth in a different but natural way.

It is the presence of these roots next to the pot walls which is a potential danger to the plant. A clay pot on a dry surface will take moisture from the roots. As soon as the walls become dry, the roots are dried up and the plant above is injured in proportion. This action accounts for most of the ragged looking plants in clay pots.

It has been proposed heretofore to paint clay pots to seal the pores. This can be practiced with only some paints, such for example as asphalt emulsions, or rubber emulsions or other paints or coating materials which will adhere to a surface that is moist when painted. Another practice heretofore recommended is to place the pot on a moist pad, as of moss, or on a compressed integral block of fiber, or one of porous clay, which pad or block stands in water or is supplied with water in such a way that it provides a moist wick for transmitting water to the pot. These practices have drawbacks. For example, when a person acquires a plant from a florist, a paint which is suitable to seal the pores is messy to apply, and some of the ingredients might injure the plant. The paint will not change the configuration of the pot, and may not be smooth, showing many of the defects in the pot. The moist pad or block calls for use of things possibly not available at the time, and when used, continued care is essential to keep it moist.

The present invention provides a removable skirt, cover or jacket for the pot, to prevent or retard greatly the loss of water by evaporation from the sides. This may be of flexible elastic material, but preferably rubber, and be either loose or tight in regard to its fitting the pot.

The object of the invention is to provide a jacket which is easily put on and taken off, and which can be highly colored, decorated, and of various shapes to give a changed appearance to the pot, as well as to retard or stop the evaporation of water.

A particular object of the invention is to provide a jacket which does not seal the bottom opening or hole usually provided in clay pots.

Still another object is to provide a jacket which effectively seals the hole so that a saucer is not required.

Another object is to provide a cup to seal the bottom hole of a clay pot, which cup may be used to bind the jacket onto the bottom of the pot.

The invention may be carried out in numerous ways, in addition to those exemplified in the accompanying drawing, in which.

The object of the invention is preferably to be attained by providing a jacket or cover which can be conveniently placed onto or removed from a pot which contains a potted plant. But this is no limitation. A very tight fitting jacket may be used, such that it has to be stretched on. The physical manipulations wtih such a jacket must be accomplished with care in order not to injure the plant. Preferably, the jacket is one which needs to be snug only near the top of the pot. It may hang loose as a skirt, or the bottom also may be drawn in to the bottom of the pot. The body may be very loose, providing an air space between the pot sides and the jacket.

Figure 1:
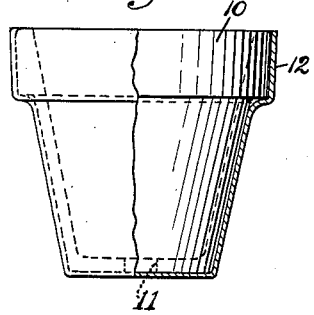
Fig. 1 represents a clay flower pot with a tight-fitting overall jacket.

In Fig. 1 the numeral 10 indicates a porous plant container, particularly a common clay pot provided with the bottom hole 11. A form fitting jacket 12 of elastic material such as rubber is made in one piece to cover both sides and bottom of the pot. The annular portion of the jacket may be normally smaller than the pot, and be stretched when on the pot. The bottom hole 11 is thus effectively sealed so that the pot may be placed on a surface which water would injure or soil, and thus a saucer is not needed. Cylindrical sides (in normal form), when good rubber is used, can be stretched onto a tapered pot, producing an attractive form fit. Colors and ornamentation may enhance the beauty of such a covered pot.

Figure 2:
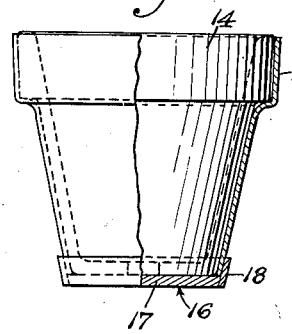
Fig. 2 represents a clay flower pot with a tubular sleeve and a bottom cap.

In Fig. 2 a pot 14 has a jacket 15 which is generally a tubular sleeve, terminating at top and bottom of the pot. The sleeve portion may be snug fitting or elastically stretched onto the pot. Some people consider that a hole is necessary for drainage, or useful for watering the pot contents from the bottom. A removable bottom cap 16 may be used to seal the bottom when desired. This has a bottom plate 17 which may be of any water-resistant material, even rubber, whether elastic or non-elastic. The bottom plate 17 has an elastic flange 18, preferably of rubber, to grip the pot itself, or the jacketed pot, as shown. Such bottom cap is useful without a jacket, when one wishes to seal the bottom hole, or provide a less hard base for the pot.

Figure 3:
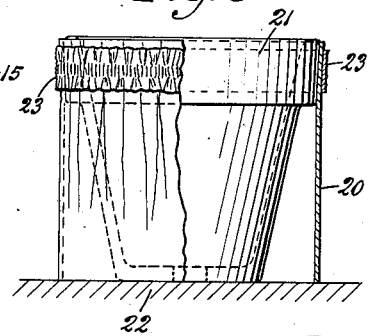
Fig. 3 represents a clay flower pot and a moisture-preserving skirt thereon.

In Fig. 3, a skirt-form of cover 20 is shown which hangs from the top of the pot 21 to the support 22 on which the pot is set. A tubular cylinder is shown, which is preferably of elastic rubber sufficiently stretched to bind the same to the pot at the top. The sleeve or skirt may be tapered or flared or otherwise altered from the cylindrical form illustrated. A band is shown at 23. This may be of any material. It may be an elastic band to serve as the sole or as an auxiliary means to bind the skirt to the pot. Used as the sole support, such band will permit the skirt to be of non-elastic material, and to be larger than the top of the pot. Thus the skirt may be gathered about the circumference. The band may be ornamental.

Figure 4:
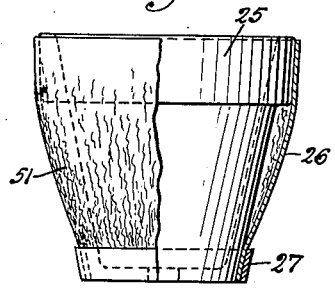
Fig. 4 represents a clay flower pot with a jacket thereon like that of Fig. 3, but with a securing belt at the bottom.

Fig. 4 represents a pot 25 with a skirt cover 26 suitably supported at the top of the pot, and bound to the bottom by a band, preferably an elastic band 27. The band 27 may be separate from the skirt, or secured to it, or integral with it. It may also be the flange 18 shown in Fig. 2.

Figure 5:
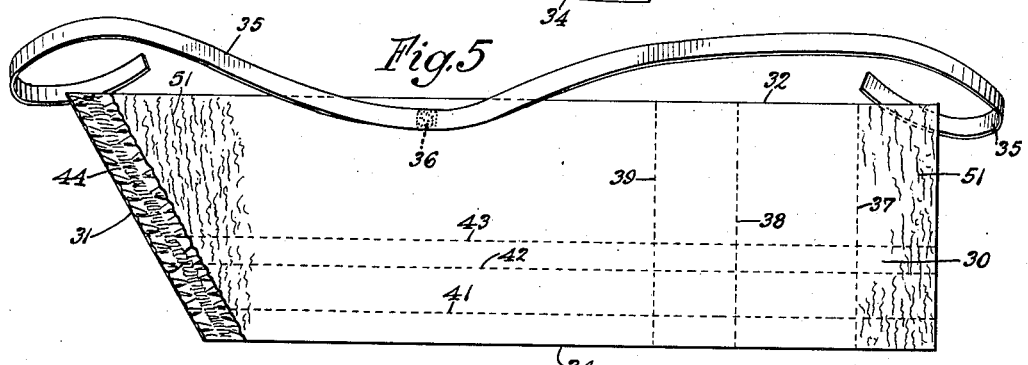
Fig. 5 represents a sheet or wrapper made for application to a multiplicity of sizes of flower pots.

The jacket is suitable to be made as an article of commerce for sale at low prices, as in a 10c store. These conditions of presentation for sale are such that the buyer may not know the size of the pot to be covered, and hence may defer purchase. Pots also vary in style and form, although there is a general standard. To make the article more universally useful, practical modifications of the above forms are desirable. One such modification is shown in Fig. 5. This consists of a flat sheet 30 of rubber, other suitable elastic material, or suitable moisture-transmission-resistant material, preferably very pliable and attractive in character. The sheet is generally rectangular, but one end may be cut on a bias 31 with the pot-top edge 32 longer than the pot-bottom end 34. This bias side is to make a cleaner looking edge where it spirals around the pot. The top edge is eventually supplied with a belt-like band 35 to hold the cover to the pot. To avoid loss of the band 35 and to facilitate use, the band may be secured to the sheet at some convenient location such as 36.

Figure 7:
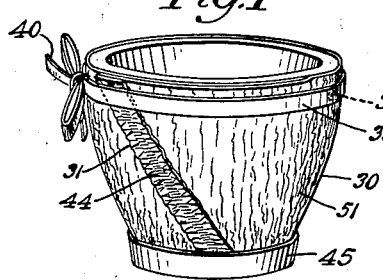
Fig. 7 represents the appearance of a flower pot as it may be jacketed with the wrapper of Fig. 5.
Figure 9:
Fig. 9 represents an adhesive strip used as a belt in securing a jacket to a pot.
Figure 8:
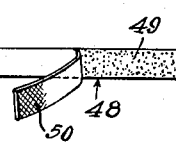
Fig. 8 illustrates a band useful in securing the jacket to the flower pot.

Such a sheet may be applied and formed into a proper sized cover, or wrapper, in a very simple manner. The length of the sheet may be cut down on a line such as dotted lines 37, 38 and 39, according to the circumference of the pot, but this is not at all necessary. The top edge 32 is passed around the pot and the strip 35 is used as a belt or tie (Fig. 7). An ornamental bow or rosette 40 may be made. The sheet skirts the pot, and of course is made to hang below the bottoms of the smaller sized pots. It is then preferably cut down on a suitable line such as 41, 42 or 43, to provide a proper length. The bias edge 31 can be made quite inconspicuous. It may be emphasized for ornamentation by special color or added pieces to provide the appearance shown at 44 in Fig. 7. The loose bottom of the skirt may be gathered in, and tied by a belt or hoop or elastic band, generally indicated at 45 (Figs. 7 and 8). The band or belt for the bottom may be an ordinary rubber band, but since these are not generally available in assorted colors, and since any single one may not be suitable for assorted sizes of pots, it is preferred to supply a length of ribbon as shown in Fig. 9. This may be a length 48 of elastic rubber or other suitable elastic or non-elastic material, such as "Cellophane", bearing a pressure or heat activated adhesive 49, such as mastic gum, suitable for uniting the length to itself or to itself and the pot cover material. A strip of protective fabric or other removable sheet material 50 may protect the adhesive.

As an article for sale the complete outfit, adaptable to various sized pots, may be the articles illustrated in Fig. 5 and Fig. 8 or 9.

Figure 6:
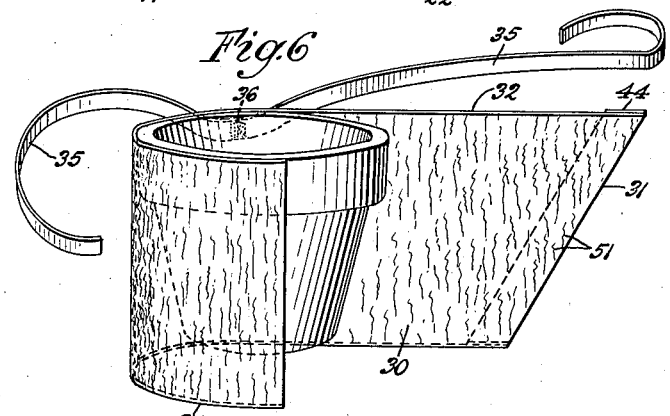
Fig. 6 represents one manner of applying to a flower pot the sheet of Fig 5.

Plain sheet rubber may be used. This is highly flexible and elastic. Such rubber may be fluted, crimped or creped and this is indicated at 51 in some of the figures, particularly with respect to the wrapper 30 of Figs. 5, 6 and 7. This is advantageous because stretch of the sheet without stretch of the rubber is permitted and is desirable at the wider top of the pot. The creping, crimping, fluting or corrugations ensmall the skirt so that its ornamental character is improved. Sheet material, whether or not it is elastic, may be so creped or crimped or fluted, and may be sold in a wide ribbon from a roll for use in accordance with this invention.

The invention provides means to improve the culture of house plants, and at the same time provide changeable and improved decoration, as well as washable decorations. Covers may be switched from pot to pot, or be provided specially, so that the appearance of the pot fits into some decorative scheme. Aside from the advantages in plant culture arising from use of the invention on porous pots, the article may be used for decorative purposes alone, such for example as converting a metal pail or can into a more ornamental container. The water-resistant character makes the cover washable.

I claim:

1. A sheet of material adapted for forming a cover or jacket for various sizes of plant containers comprising a form of sheet material which is relatively impervious to moisture, and which has two edges forming an acute angle, said sheet when wrapped about a plant container having one of said edges snugly encircling the top edge of the container, and the other of said edges spiralling about the container.

2. A sheet of material adapted for forming a cover or jacket for various sizes of plant containers comprising a form of sheet material which is relatively impervious to moisture, said sheet having a straight line edge, and a belt-like strip secured to the sheet near said edge to serve as a tie or belt when said sheet is wrapped about a plant container, said sheet having a biased edge meeting said first edge at less than a right-angle.

3. A cover for downwardly tapering porous flower pots comprising a flat thin flexible sheet of moisture-transmission resistant material adapted to be wrapped loosely about the body of a flower pot and to provide an overlapping portion at both top and bottom of the pot as a side joint or seal, and belt-like means to hold the wrapped sheet snugly to the top of the pot as a vapor seal.

4. A cover for downwardly tapering porous flower pots comprising a flat thin flexible sheet of moisture-transmission resistant material adapted to be wrapped loosely about the body of a flower pot and to provide an overlapping portion at both top and bottom of the pot as a side joint or seal, belt-like means to hold the wrapped sheet snugly to the top of the pot as a vapor seal, and belt-like means to hold the wrapped sheet snugly to the bottom of the pot as a vapor seal.

5. A flat sheet of moisture-transmission resistant material with a generally linear edge, a tie associated with said edge for securing said edge snugly to the top of a pot about which said sheet may be wrapped, said sheet having an area adapted to be reduced by trimming one or more of the other edges to provide a wrapper to be placed about the body of a flower pot with an overlapping joint as a seal.

6. A flat sheet of moisture-transmission resistant material with a generally linear edge, a tie associated with said edge for securing said edge snugly to the top of a pot about which said sheet may be wrapped, said sheet also having a second edge meeting the first edge at an acute angle, the sheet having an area adapted to be reduced by trimming the sheet at remaining edges to provide a wrapper to be placed about the body of a flower pot with an overlapping joint as a seal.

W. BARTLETT JONES.